US011889253B2

(12) United States Patent
Barrieau et al.

(10) Patent No.: US 11,889,253 B2
(45) Date of Patent: Jan. 30, 2024

(54) EARPHONE CUSHION WITH ACOUSTIC MESH-COVERED PORT

(71) Applicant: Bose Corporation, Framingham, MA (US)

(72) Inventors: Johnpaul Philias Barrieau, Franklin, MA (US); Masanori Honda, Northborough, MA (US)

(73) Assignee: Bose Corporation, Framingham, MA (US)

( * ) Notice: Subject to any disclaimer, the term of this patent is extended or adjusted under 35 U.S.C. 154(b) by 68 days.

(21) Appl. No.: 17/571,736

(22) Filed: Jan. 10, 2022

(65) Prior Publication Data

US 2023/0224615 A1 Jul. 13, 2023

(51) Int. Cl.
*H04R 25/00* (2006.01)
*H04R 1/10* (2006.01)

(52) U.S. Cl.
CPC ......... *H04R 1/1008* (2013.01); *H04R 1/1066* (2013.01); *H04R 2201/10* (2013.01)

(58) Field of Classification Search
CPC .. H04R 1/1008; H04R 1/1075; H04R 1/1083; H04R 2400/11; H04R 2201/10
See application file for complete search history.

(56) References Cited

U.S. PATENT DOCUMENTS 4,856,118 A 8/1989 Sapiejewski
10,187,716 B1 1/2019 England et al.
11,277,679 B1 * 3/2022 Lagler .................. H04R 1/1075
2009/0110226 A1 4/2009 Ishida
2011/0216909 A1 * 9/2011 Sapiejewski ......... H04R 1/1083 381/371
2021/0337294 A1 * 10/2021 Dory .................... H04R 1/1008

FOREIGN PATENT DOCUMENTS

JP S49149733 U 12/1974
WO 2012135181 A1 10/2012

OTHER PUBLICATIONS

PCT International Search Report and Written Opinion for International Application No. PCT/US2023/010483, dated May 4, 2023, 9 pages.

* cited by examiner

*Primary Examiner* — Amir H Etesam
(74) *Attorney, Agent, or Firm* — Hoffman Warnick LLC

(57) ABSTRACT

Various implementations include earphone cushions and related headsets. In particular aspects, an earphone cushion includes: a body including a front surface configured to engage or surround an ear of a user, an outer side surface, an inner side surface opposing the outer side surface, and a rear surface opposing the front surface; a cover over a portion of the body, the cover including an outside radiating surface for contacting at least a portion of the user's head, wherein the cover includes a set of ports along at least one of (i) the inner side surface, (ii) the rear surface, or (iii) a junction between the inner side surface and the rear surface; and an acoustic mesh covering at least one port in the set of ports.

20 Claims, 5 Drawing Sheets

EARPHONE CUSHION WITH ACOUSTIC MESH-COVERED PORT

TECHNICAL FIELD

This disclosure generally relates to earphones. More particularly, the disclosure relates to earphone cushions and related headsets.

BACKGROUND

In certain cases, the earphone cushion can impact the passive insertion gain (PIG) of the headphone earcup to which it belongs. For example, the material in the earphone cushion, and the acoustic energy transmitted therethrough, can impact the performance of the headphone. Balancing passive insertion gain concerns with additional acoustic parameters and device fit can provide numerous design challenges.

SUMMARY

All examples and features mentioned below can be combined in any technically possible way.

Various implementations include earphone cushions and related headsets. In some particular aspects, an earphone cushion includes: a body including a front surface configured to engage or surround an ear of a user, an outer side surface, an inner side surface opposing the outer side surface, and a rear surface opposing the front surface; a cover over a portion of the body, the cover including an outside radiating surface for contacting at least a portion of the user's head, where the cover includes a set of ports along at least one of (i) the inner side surface, (ii) the rear surface, or (iii) a junction between the inner side surface and the rear surface; and an acoustic mesh covering at least one port in the set of ports.

In additional particular aspects, a headset includes: a pair of earcups having a front opening configured to be adjacent to an ear of a user when worn by the user; and a pair of earphone cushions sized to secure to the front opening of respective ones of the earcups, each earphone cushion having: a body including: a front surface configured to engage or surround the ear of a user, an outer side surface, an inner side surface opposing the outer side surface, and a rear surface opposing the front surface; a cover over a portion of the body, the cover having an outside radiating surface for contacting at least a portion of the user's head, the cover including a set of ports along at least one of (i) the inner side surface, (ii) the rear surface, or (ii) a junction between the inner side surface and the rear surface; and an acoustic mesh covering at least one port in the set of ports.

In further aspects, a method of manufacturing an earphone cushion includes: forming a set of ports in a cover configured to cover a body, where the body has: a front surface configured to engage or surround an ear of a user, an outer side surface, an inner side surface opposing the outer side surface, and a rear surface opposing the front surface; coupling an acoustic mesh to the set of ports in the cover; and coupling the cover to the earphone cushion body, where the set of ports and the acoustic mesh covering the ports are located along at least one of: (i) the inner side surface, (ii) the rear surface, or (iii) a junction between the inner side surface and the rear surface.

Implementations may include one of the following features, or any combination thereof.

In certain aspects, the set of ports includes at least one port along the rear surface.

In particular cases, the set of ports includes at least one port along the inner side surface.

In some implementations, the set of ports includes at least one port along the junction between the inner side surface and the rear surface.

In certain aspects, the acoustic mesh functions as a seam between portions of the cover along the inner side surface and the rear surface, or portions of the cover along the inner side surface and the front surface.

In particular cases, the set of ports includes at least six ports.

In some implementations, a total surface area of the set of ports is equal to a surface area of a single port up to an approximate surface area of at least one of the inner side surface, the rear surface or the front surface.

In certain aspects, the set of ports and covering acoustic mesh are located only along: the rear surface, or the rear surface and the inner side surface.

In some cases, the acoustic mesh controls passive insertion gain (PIG) of a headphone earcup including the earphone cushion at frequencies of approximately one kiloHertz (kHz) and above.

In particular aspects, the acoustic mesh controls an acoustic transfer function between a driver signal and a feedback microphone signal ($G_{sd}$) in a headphone earcup including the earphone cushion for a user wearing eyeglasses and the headphone earcup.

In certain cases, the cover includes pleather, an acrylic paint film, leather, or a composite material.

In some aspects, the body includes a material configured to compress when the earphone cushion contacts the portion of the user's head.

In particular implementations, the acoustic mesh mitigates variability in an acoustic response of the material of the body.

In certain cases, the acoustic mesh comprises a fabric.

In some aspects, the acoustic mesh has a Rayl value of approximately 6 to approximately 700.

In particular cases, a headphone earcup including the earphone cushion.

In certain implementations, the headphone earcup includes a port along an outer surface thereof.

In some cases, the acoustic mesh permits acoustic energy from a front acoustic volume of the headphone earcup to enter the body of the cushion, and a remainder of the cover along the inner side surface and the rear surface excluding the acoustic mesh substantially prevents acoustic energy from the front acoustic volume from entering the body of the cushion.

In certain aspects, the headset further includes a continuous headband spring section connecting each of the pair of earcups, where the continuous headband spring section permits adjustment of a vertical position of each of the earcups without modifying a length of the continuous headband spring section.

In some implementations, the set of ports and the acoustic mesh covering the set of ports are located along only one of: (i) the inner side surface, (ii) the rear surface, or (iii) the junction between the inner side surface and the rear surface.

Two or more features described in this disclosure, including those described in this summary section, may be combined to form implementations not specifically described herein.

The details of one or more implementations are set forth in the accompanying drawings and the description below.

Other features, objects and benefits will be apparent from the description and drawings, and from the claims.

Figure 1:
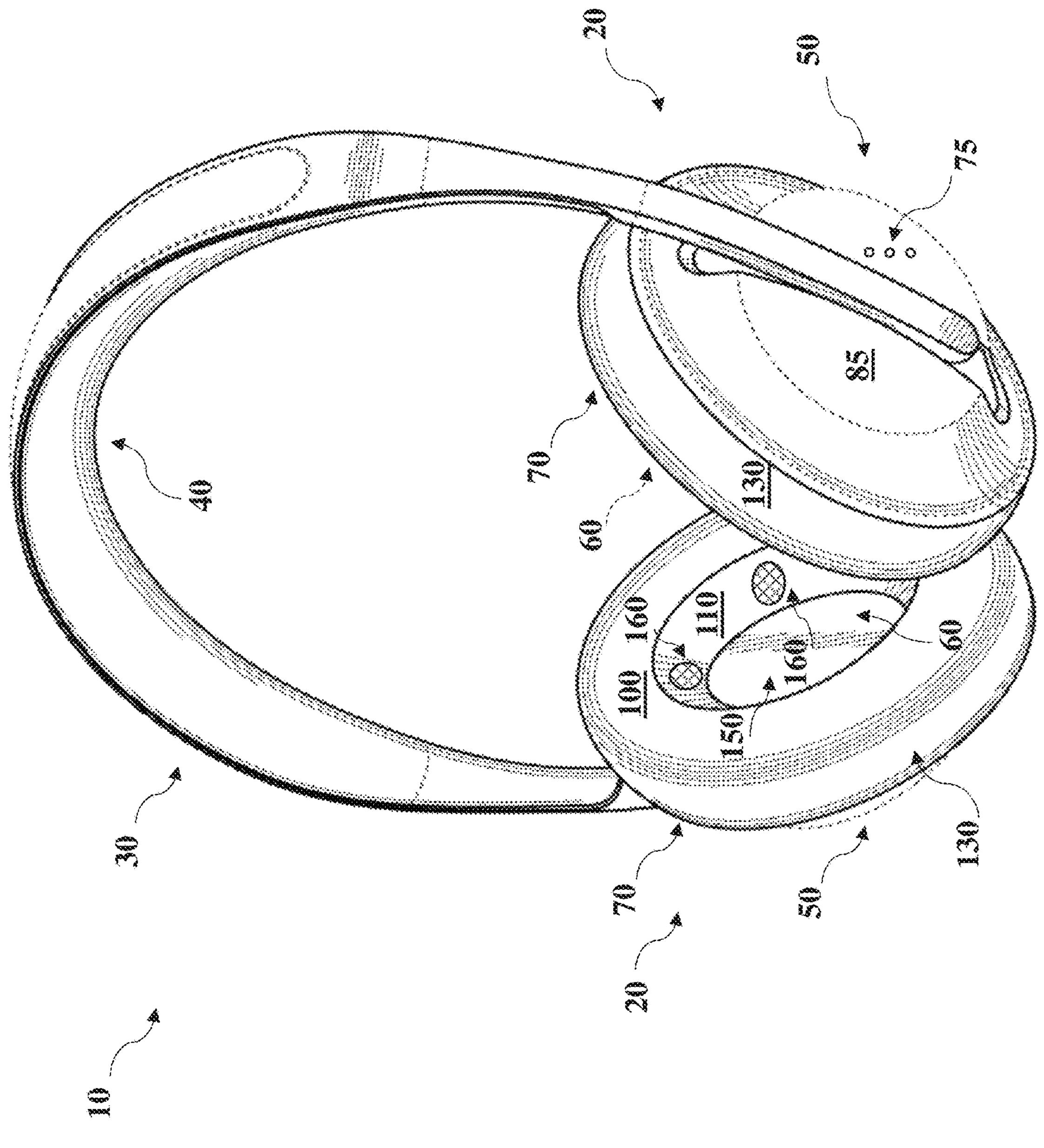
FIG. 1 is perspective view of a headset including an earphone according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that an earphone cushion can benefit from at least one port along an inner side surface, rear surface, or junction between such surfaces. The port(s) are covered by an acoustic mesh. In various implementations, the ported cushion can control the passive insertion gain (PIG) of a headphone earcup employing the cushion.

In particular implementations, the mesh-covered port(s) along the inner side surface, rear surface, or junction between such surfaces can aid in controlling PIG of a headphone earcup across a range of frequencies, e.g., at approximately 1 kilo-Hertz (kHz) and above. In certain of these cases, the headphone earcup is an externally ported earcup having a port along an outer surface thereof (i.e., when worn by a user). In such cases, the acoustic mesh over the cushion port(s) can permit acoustic energy from a front acoustic volume of the earcup to enter the body of the cushion, while a remainder of the cover along the inner side surface and the rear surface excluding the acoustic mesh substantially prevents acoustic energy from the front acoustic volume from entering the body of the cushion.

The reduction of sound reaching the ear through the passive path, due to the presence of the earphone, is referred to herein as passive insertion loss. A vent or port on the earcup makes the passive insertion loss lower, which increases the magnitude of the passive path contribution to the combined (active plus passive) signal. This passive path contribution is referred to as the passive insertion gain (PIG) herein. As noted herein, controlling PIG in a ported (or vented) earcup can be beneficial in various scenarios, e.g., across particular frequency ranges.

Commonly labeled components in the FIGURES are considered to be substantially equivalent components for the purposes of illustration, and redundant discussion of those components is omitted for clarity. Numerical ranges and values described according to various implementations are merely examples of such ranges and values, and are not intended to be limiting of those implementations. In some cases, the term "approximately" is used to modify values, and in these cases, can refer to that value+/−a margin of error, such as a measurement error, which may range from up to 1-5 percent.

Figure 2:
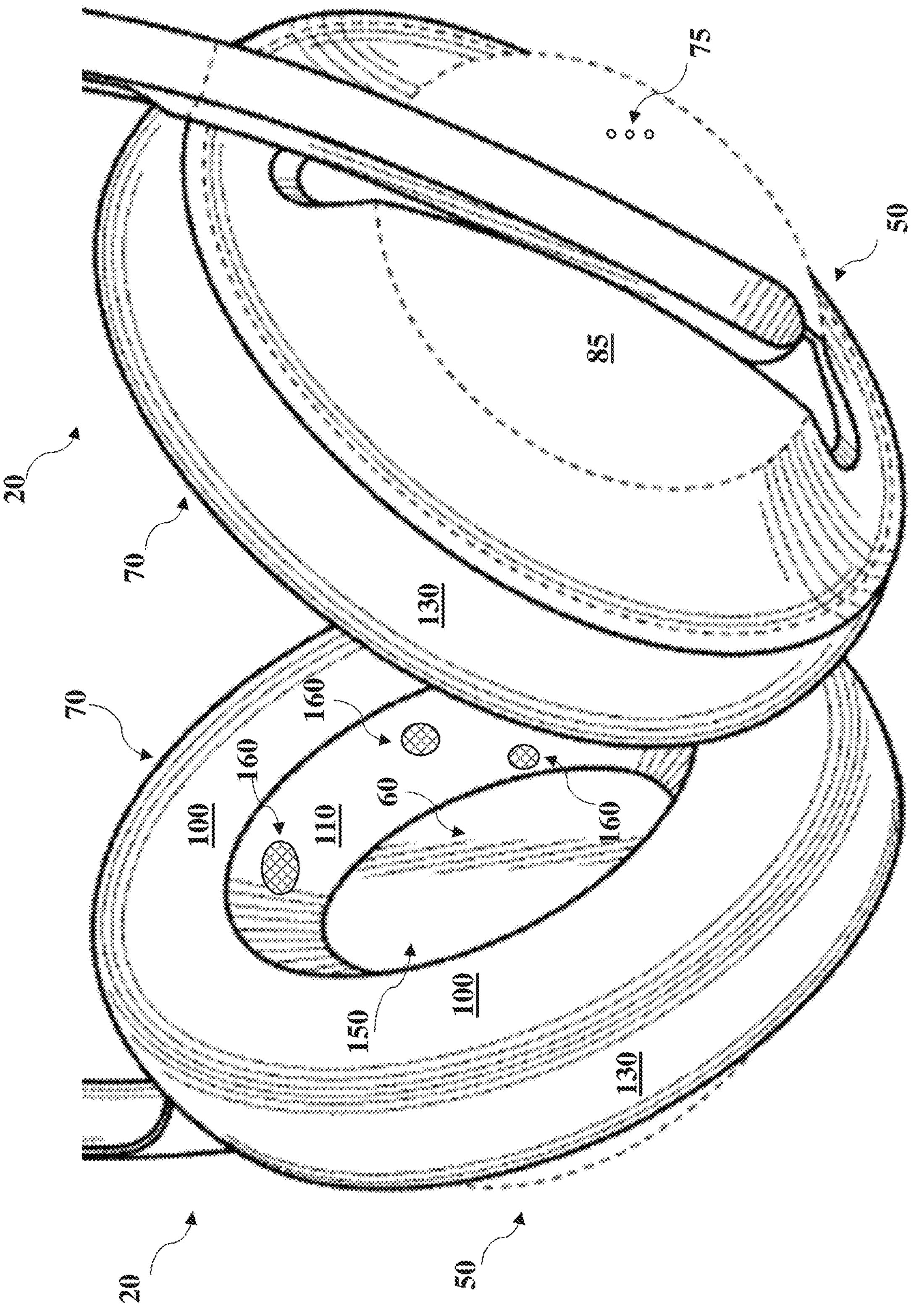
FIG. 2 is a close-up perspective view of a set of earphones according to various implementations.

FIG. 1 depicts an audio device, including a headset 10 according to various implementations. FIG. 2 shows a close-up perspective view of a portion of the headset 10 in FIG. 1. These FIGURES are referred to concurrently. In this example, the headset 10 is illustrated as a pair of around-ear headphones. However, it is understood that principles of the disclosed implementations can be applied to on-ear headphones in various implementations. Headset 10 can include a pair of earpieces (or, earphones) 20 configured to fit over the ear, or on the ear, of a user. A headband 30 spans between the pair of earphones 20 and is configured to rest on the head of the user (e.g., spanning over the crown of the head or around the head). The headband 30 can include a head cushion 40 in some implementations. Stored within one or both of the earphones 20 are electronics and other components for controlling audio output at the headset 10 (not shown).

In particular cases, the headband 30 includes a continuous headband spring section connecting the earphones 20. In some examples, the continuous headband spring section permits adjustment of a vertical position of each of the earphone 20 without modifying a length of the continuous headband spring section. That is, the headband 30 can be configured to maintain a constant length while the earphones 20 are configured to slide up and down the headband 30 and/or rotate about the headband 30 to adjust the fit of the headset 10. Additional aspects of the headband 30 are described in U.S. Pat. No. 10,743,106 (filed Aug. 9, 2018), which is incorporated by reference in its entirety.

Each earphone 20 can include an earcup 50 having a front opening 60 (one visible in this view) configured to be adjacent to an ear of a user when worn by the user. Each earphone 20 also includes an earphone cushion (or simply, cushion) 70 sized to secure to the front opening 60 of the earcup 50. In various implementations, the earphone cushion 70 is configured contact a portion of the user's head. In particular cases, the earphone cushion 70 is configured to surround a user's ear (e.g., a circum-aural design) during use of the headset 10, e.g., to contact a portion of the user's head adjacent to the ear. However, in other implementations, the earphone cushion 70 can be configured to rest on at least a portion of the user's ear (e.g., a supra-aural design).

In various implementations, each earcup 50 can include at least one external port 75 to the ambient environment when worn by a user. In certain examples, one or more port(s) 75 are located along an outer surface 85 of the earcup 50. While a plurality of ports 75 are illustrated in the example depiction in FIGS. 1 and 2, any number of ports 75 can be located along the outer surface 85 according to various implementations, e.g., one, two, three, four or more.

Figure 3:
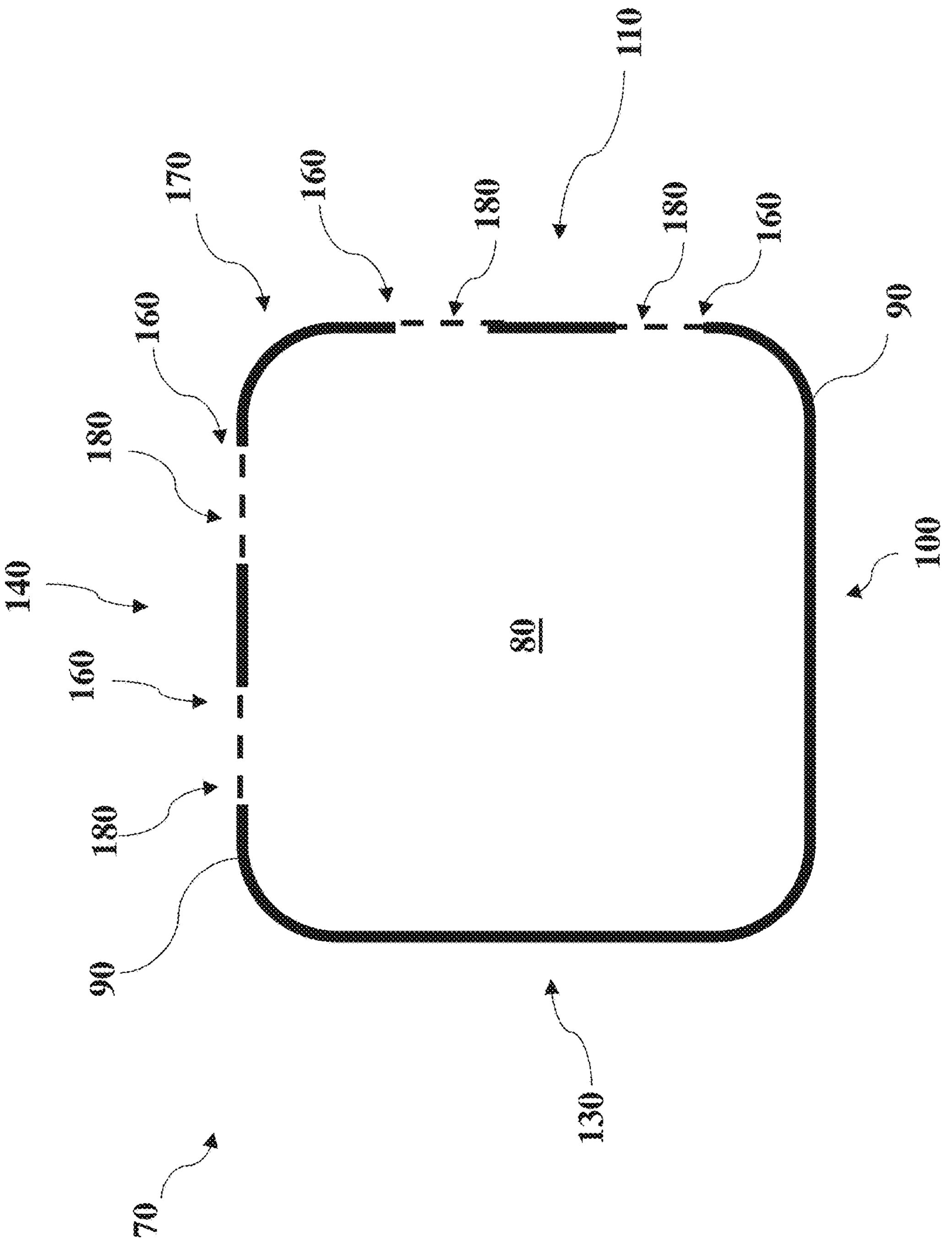
FIG. 3 is a partial cross-sectional view of an earphone cushion according to various implementations.

FIG. 3 illustrates additional features of the cushion 70 separated from the earcup 50, in a cross-sectional depiction. In FIG. 3, the cushion 70 is shown including a body 80, which is at least partially surrounded by a cover 90. In various implementations, the body 80 includes a material configured to compress when the earphone cushion 70 contacts a portion of a head of the user adjacent to the ear. In certain examples, the body 80 can include or consist of a bulk, or inner portion, and an outer surface. Both may include or consist of a polyurethane foam and/or another type of compliant material. The material of the bulk of the body 80 may be a partially reticulated polymer foam having cell sizes within the bulk of the body 80 with diameters of between about 100 μm and about 750 μm. The cell size at the outer surface of the body 80 may be smaller than that in the bulk of the body 80, for example, with diameters of between about 25 μm and about 100 μm. When uncovered by another material, the outer surface of the body 80 may be at least partially acoustically transparent to allow sound waves to pass through the outer surface and into the bulk of the body 80. The body 80 may allow air to flow through at a rate of about 10 $cm^3/cm^2$ second or less and may have an acoustic dampening peak at between about 1 kHz and about 2.5 kHz. Other examples of materials in the body 80 are described in U.S. Pat. Nos. 10,187,716 and 10,659,861, each of which is incorporated by reference in its entirety.

The cover 90 is configured to fit snugly around the body (or, core) 80 and in use, has an outside radiating surface that is configured contact the user's ear and/or a portion of the user's head adjacent to the ear. In certain implementations, the cover 90 includes one or more of: pleather, an acrylic paint film, leather, or a composite material. Other examples of materials in the cover 90 are described in U.S. Pat. Nos. 10,187,716 and 10,659,861, each previously incorporated by reference in its entirety. In particular examples, the cover 90 includes pleather, leather or a composite material. According to particular implementations, the cover 90 is formed of pleather in a single piece, e.g., sheet, and is wrapped around portions of the body 80 during manufacture of the ear cushion 70.

With reference to FIGS. 1-3, in particular cases, the earphone cushion 70 has a front surface 100 that is configured to engage or surround the ear of the user. The front surface 100 is configured to contact the user's head adjacent to the ear in the circum-aural design, or directly contact the user's ear in a supra-aural design. The front surface 100 is compressible. That is, the front surface 100 will compress when pressed to contact the user's ear or head adjacent to the ear. The inner side surface 110 is also compressible in various implementations. When an earphone 20 is worn by the user, the inner side surface 110 is hidden from view, and may contact or surround the user's ear. In certain cases, at least a portion of the outer side surface 130 is visible when the earphone 20 is worn by the user. A rear surface 140 (FIG. 3) of the cushion 70 opposes the front surface 100. In various implementations, for example as seen in FIGS. 1-3, at least a portion of the front surface 100, inner side surface 110 and rear surface 140 are exposed to the front acoustic volume 150 of the earcup 50, that is, the acoustic volume that is defined by the front opening 60 (FIG. 2) and the body 80.

Figure 4:
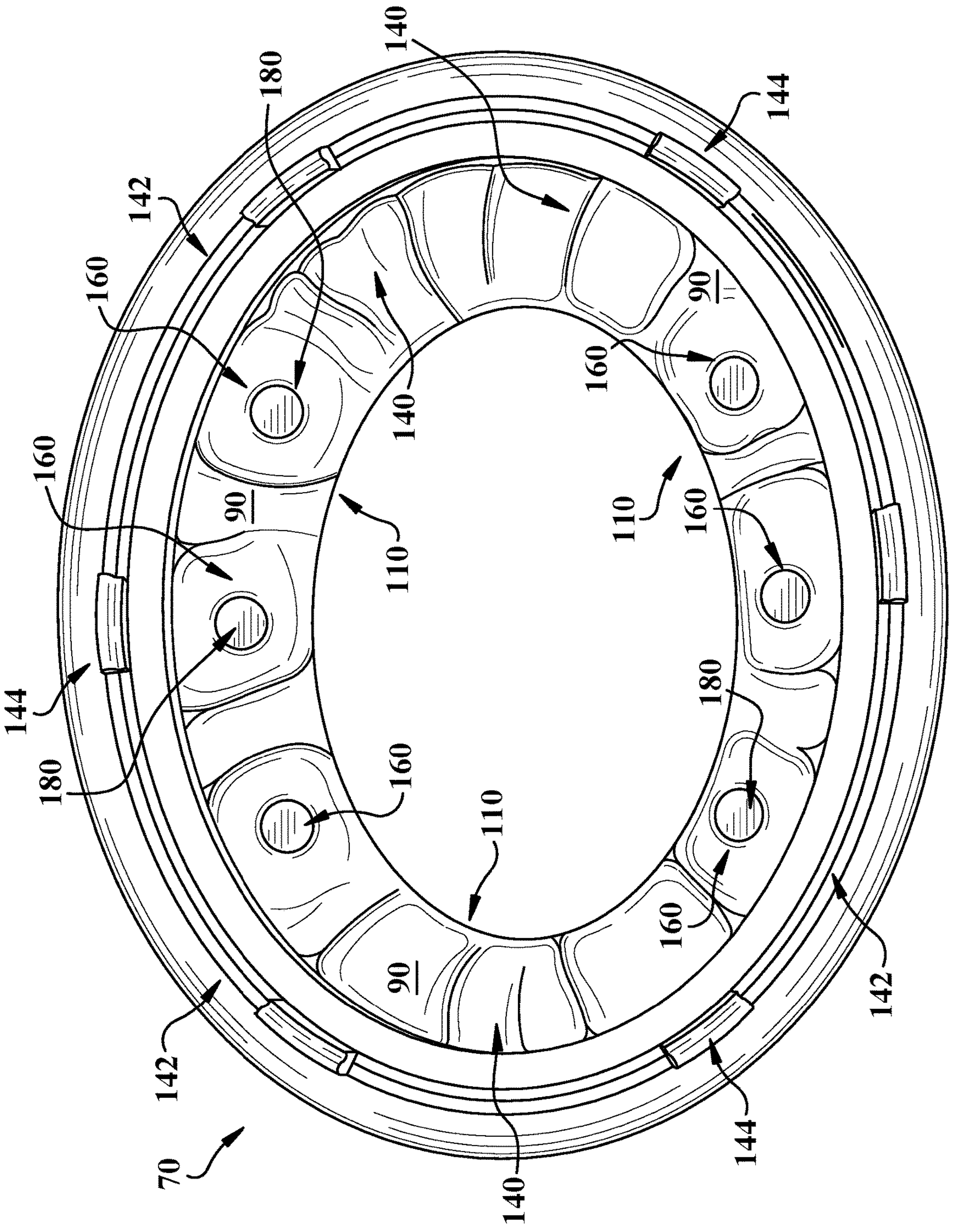
FIG. 4 is an image in plan view of a portion of an earcup according to various implementations.

FIG. 4 is an image, in plan view, of the cushion 70 separated from the earcup 50. In this view, the cushion 70 is shown connected to a mount 142 for coupling with the frame of the earcup 50. In certain cases, the mount 142 includes one or more mating features 144 for coupling with complementary mating features in the earcup frame. Additional aspects of an earcup frame and mechanisms for affixing a cover 90 to an earcup mount 142 are described in U.S. Provisional Patent Application No. 63/158,510 (Earphone Cushion with Mechanically Grounded Cover, filed on Mar. 9, 2021), the entire contents of which are incorporated by reference. FIG. 4 illustrates the rear surface 140 and a portion of the inner side surface 110, with the overlying cover 90. The front surface 100 is obstructed from view in FIG. 4. With reference to both FIGS. 3 and 4, in various implementations, the cover 90 includes a set of ports 160 along one or more of: (i) the inner side surface 110, (ii) the rear surface 140, or (iii) a junction 170 between the inner side surface 110 and the rear surface 140. Port(s) 160 can take any conventional port shape, including, e.g., approximately circular, oblong, rectangular, etc.

In certain cases, the set of ports 160 includes a single port 160. However, in additional implementations, the set of ports 160 includes a plurality of ports 160, e.g., two or more ports located along one or more of the inner side surface 110, rear surface 140 and/or junction 170 between the inner side surface 110 and the rear surface 140. In some examples, a plurality of ports 160 are located along each of the inner side surface 110 and the rear surface 140. In particular implementations, at least one port 160 is located along the rear surface 140. In additional implementations, at least one port 160 is located along the inner side surface 110. In further implementations, at least one port 160 is located along the junction 170 between the inner side surface 110 and the rear surface 140. In still further examples, port(s) 160 are located only along the rear surface 140, or the rear surface 140 and the inner side surface 110. In some cases, the set of ports 160 includes at least six total ports. In additional particular cases, the set of ports 160 includes at least eight total ports. According to some implementations, subsets of the ports 160 are arranged approximately equidistantly from a midline of a respective earcup 50. In additional implementations, subsets of the ports 160 are equally spaced relative to one another along a given surface.

In additional cases, the total surface area of the ports 160 is as little as approximately the surface area of a single port 160, up to an approximate surface area of at least one of the inner side surface 110, the rear surface 140 or the front surface 100. That is, in certain cases, the ports 160 cover up to approximately an entire surface of the cover 90, and in particular cases, can cover multiple surfaces of the cover 90 (e.g., up to two surfaces).

At least one of the ports 160 is covered by an acoustic mesh 180. In particular implementations, the acoustic mesh 180 is approximately acoustically transparent, and permits acoustic energy to pass therethrough with only nominal resistance. In certain aspects, the acoustic mesh 180 includes a fabric mesh, e.g., a woven fabric mesh. In additional implementations, the acoustic mesh 180 can include at least some metal. In particular cases, the acoustic mesh has a Rayl value of approximately 6 to approximately 700. In certain of these cases, the acoustic mesh has a Rayl value of approximately 6 to approximately several hundred, e.g., 300 or 400. In some aspects, the Rayl value is selected to balance acoustic transparency with comfort (e.g., compliance) of the cushion material. For example, in particular implementations where the cover 90 includes a plurality of ports 160, the Rayl value can be selected between approximately 6 and approximately 300, or approximately 6 and approximately 400, to maintain comfort in a cushion 70 worn by a user.

According to some aspects, the ports 160 are formed as openings in the cover 90, and the acoustic mesh is adhered, affixed or otherwise integrated into the cover 90 to fill the openings. In certain cases, the acoustic mesh 180 is heat staked to the cover 90. In other implementations, the acoustic mesh 180 is sewn into the cover 90. In still further implementations, the acoustic mesh 180 is stamped or adhered to the cover 90 around the openings, or otherwise directly bonded to the cover 90. In additional implementations, the acoustic mesh 180 can be formed along with, or at a different time than the cover 90. In still further implementations, the acoustic mesh 180 and/or the cover 90 can be additively manufactured and integrated to form the cover 90 with acoustic mesh 180 over ports therein.

Figure 5:
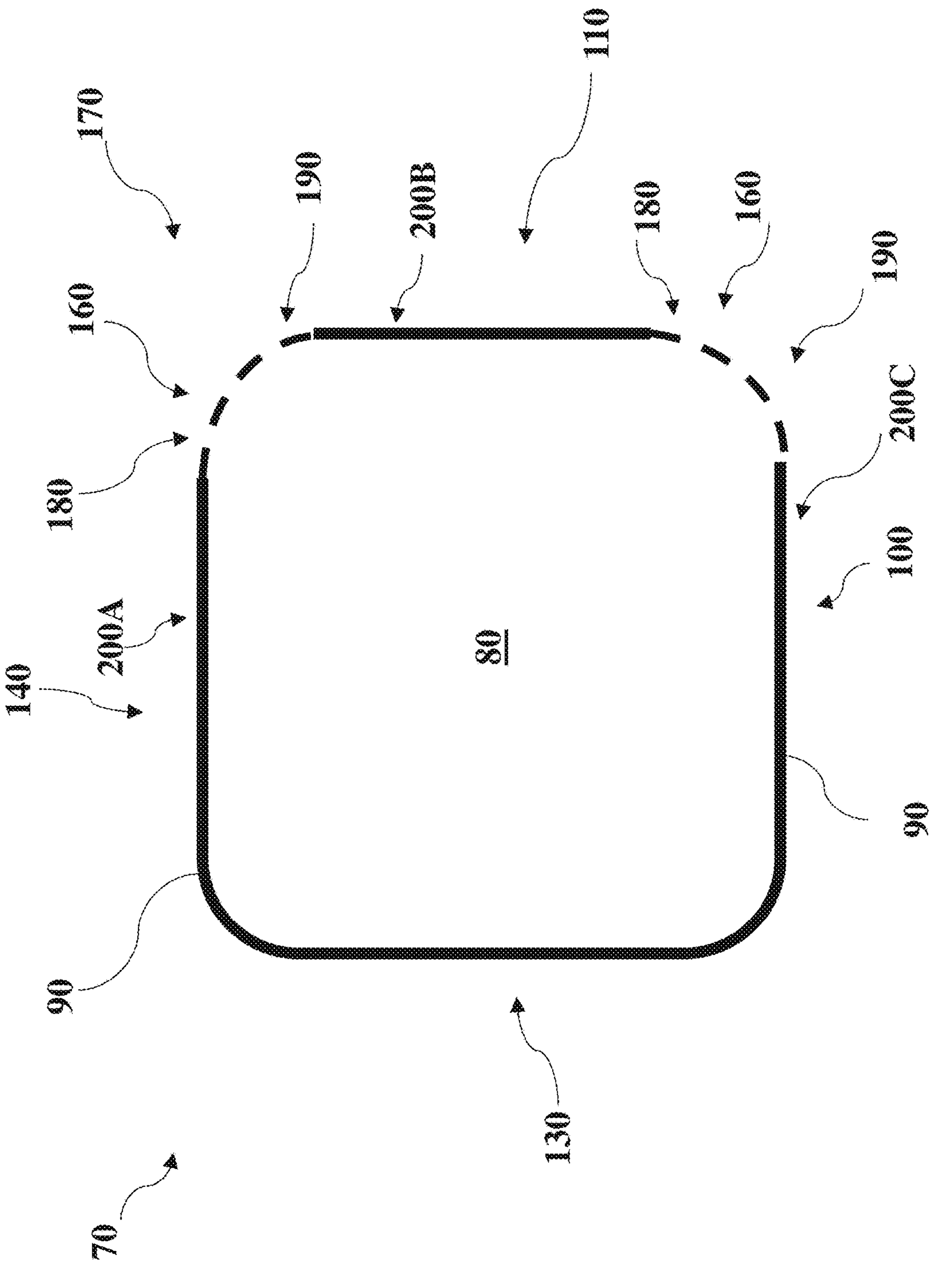
FIG. 5 is a partial cross-sectional view of an earphone cushion according to various additional implementations.

In additional implementations, shown in the cross-sectional depiction in FIG. 5, the cushion 70 can include one or more large ports 160 spanning between portions of the material of the cover 90. For example, the acoustic mesh 180 can function as a seam 190 between portions 200A, 200B of the cover 90 along the inner side surface 110 and the rear surface 140, or portions 200B, 200C of the cover 90 along the inner side surface 110 and the front surface 100. In such cases, the acoustic mesh 180 may wrap annularly around the cushion 70.

In any case, the acoustic mesh 180 permits acoustic energy from the front acoustic volume 150 of the earcup 50 to enter the body 80 of the cushion 70. The remainder of the cover 90 along the inner side surface 110 and the rear surface 140 (excluding the mesh 180) substantially prevents acoustic energy from the front acoustic volume 150 from entering the body 80 of the cushion 70. That is, when seated on or around a user's ear, the cover 90 substantially prevents the acoustic energy from the front acoustic volume 150 from entering the body 80 of the cushion 70, other than through the ports 160.

In certain cases, the acoustic mesh 180 mitigates variability in the acoustic response of the material of the body 80. That is, a set of earcups 50 employing the acoustic mesh-covered ports 160 can provide a more consistent acoustic response than similarly configured earcups without the mesh-covered ports 160. For example, relative to the materials used to form the body 80, the acoustic mesh 180 can provide a more consistent acoustic response. As such, employing the mesh-covered ports 160 in one or more portions of the cover 90 can normalize the acoustic response of the cushion 70, providing more consistent, or predictable, acoustic characteristics in which to provide the acoustic output from the driver.

In various implementations, the acoustic mesh 180 controls passive insertion gain (PIG) of a headphone earcup 50 that includes the cushion 70. In particular cases, the acoustic mesh 180 over ports 160 can control PIG in the headphone earcup 50 over a range of frequencies, e.g., at frequencies of approximately 1 kilo-Hertz (kHZ) and above. In various implementations, the earcup 50 provides acoustic benefits as compared with a nominal earcup having an external port (e.g., port 75, FIGS. 1 and 2) and a cushion without any mesh-covered ports (e.g., ports 160), as well as a sealed earcup that does not have an external port and also has a cushion without any mesh-covered ports. That is, in various implementations, the ported cushion controls the passive insertion gain of the headphone as compared with conventional headphones, e.g., in frequencies around 1 kHz and up. That is, relative to the nominal and sealed earcup, the cushion 70 with acoustic mesh-covered ports has less variation in PIG as frequencies approach and exceed 1 kHz.

In still further implementations, the acoustic mesh 180 over ports 160 can enhance acoustic characteristics of the earphone 50 compared with conventional earphones, for example, improving the quality of fit across a population of users. Fit quality can impact acoustic performance, particularly for an earphone that relies at least in part on acoustic sealing (e.g., passive noise reduction). Fit quality can be impacted by multiple factors, including but not limited to user anatomy (e.g., ear size, head shape) and accessory usage (e.g., whether the user is wearing glasses, a hat, or a hair accessory). The earphones 50 with ports 160 have an effectively expanded front acoustic volume 150 (relative to earphones without the ports 160) which can enhance fit quality across a variety of users. In particular cases, the port(s) 160 control an acoustic transfer function between a driver signal and a feedback microphone signal ($G_{sd}$) in a headphone earcup including the earphone cushion 70 for a user with an acoustic seal-altering characteristic (e.g., fit that negatively impacts the acoustic seal). The mesh-covered ports can mitigate variation in $G_{sd}$ in an earcup 50 that includes the cushion 70, making the acoustic output more consistent across a population of users with different fit characteristics. In other terms, the mesh-covered ports can mitigate variation in the acoustic response of the front volume 150 of an earcup 50 that includes the cushion 70.

With continuing reference to FIGS. 1-5, further implementations can include a method of manufacturing an earphone cushion, e.g., cushion 70. In particular cases, the method can include the following processes: P1: forming a set of ports 160 in a cover 90 configured to cover a body 80. In certain cases, the cover 90 is manufactured with ports 160 therein. In additional cases, the ports 160 are formed in the cover 90 via material removal such as cutting, punching, etc. The method can further include process P2: coupling an acoustic mesh 180 to the set of ports 160 in the cover 90. As described herein, in additional implementations, the acoustic mesh 180 can be coupled with the cover 90 proximate the set of ports 160 in a number of approaches, including, e.g., heat staking, direct material bonding, adhesion, interlocking/interweaving fabric, etc. The method can further include process P3: coupling the cover 90 to the earphone cushion body 80. In various implementations, the cover 90 is connected to a mounting element proximate the body 80, e.g., a rigid element such as a mount or frame 142 (FIG. 4). In additional implementations, the cover 90 is wrapped around at least a portion of the body 80 and connected with itself.

While various components in the earcup(s) 50 are described as separate, it is understood that one or more components of the earcup(s) 50 can be formed as a unitary component, i.e., formed as a single component, such as through an additive manufacturing process, casting, molding, etc. In other cases, components can be is composed of separately formed parts that are bound together, e.g., with adhesive, heat staking, bonding, or via direct couplers or fasteners such as pins, clips, screws, etc.

As noted herein, in contrast to conventional headsets, the headsets disclosed according to implementations can include earcups with a cover that include at least one mesh-covered port, mitigating vibration of the cover and controlling the passive insertion gain of the headphone. In various implementations, the acoustically ported cover enhances the passive insertion gain of the headphone as compared with conventional headphones, e.g., with particular benefits around 1 kHz and above. As compared with conventional headsets, the headsets disclosed according to various implementations also provide consistent acoustic performance across various device fits, for example, by mitigating variation in $G_{sd}$. Even further, the mesh-covered ports disclosed according to various implementations can enhance earcup design by providing adaptable acoustic characteristics for various earcup sizes, material types (e.g., types of cushion materials), front cavity sizes and/or driver sizes.

One or more components in the electronic devices described herein can be formed of any conventional electronic device material, e.g., a heavy plastic, metal (e.g., aluminum, or alloys such as alloys of aluminum), composite material, etc. It is understood that the relative proportions, sizes and shapes of the transducer(s) and components and features thereof as shown in the FIGURES included herein can be merely illustrative of such physical attributes of these components. That is, these proportions, shapes and sizes can be modified according to various implementations to fit a variety of products.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding).

A number of implementations have been described. Nevertheless, it will be understood that additional modifications may be made without departing from the scope of the inventive concepts described herein, and, accordingly, other implementations are within the scope of the following claims.

We claim:

1. An earphone cushion, comprising:

a body including a front surface configured to engage or surround an ear of a user, an outer side surface, an inner side surface opposing the outer side surface, and a rear surface opposing the front surface;

a cover over a portion of the body, the cover including an outside radiating surface for contacting at least a portion of the user's head, wherein the cover includes a set of ports along at least one of (i) the inner side surface, (ii) the rear surface, or (iii) a junction between the inner side surface and the rear surface; and an acoustic mesh covering at least one port in the set of ports.

2. The earphone cushion of claim 1, wherein the set of ports includes at least one port along the rear surface.

3. The earphone cushion of claim 1, wherein the set of ports includes at least one port along the inner side surface.

4. The earphone cushion of claim 1, wherein the acoustic mesh functions as a seam between portions of the cover along the inner side surface and the rear surface, or portions of the cover along the inner side surface and the front surface.

5. The earphone cushion of claim 1, wherein the set of ports includes at least six ports.

6. The earphone cushion of claim 1, wherein a total surface area of the set of ports is equal to a surface area of a single port up to an approximate surface area of at least one of the inner side surface, the rear surface or the front surface.

7. The earphone cushion of claim 1, wherein the set of ports and covering acoustic mesh are located only along: the rear surface, or the rear surface and the inner side surface.

8. The earphone cushion of claim 1, wherein the acoustic mesh controls passive insertion gain (PIG) of a headphone earcup including the earphone cushion at frequencies of approximately one kilo-Hertz (kHz) and above.

9. The earphone cushion of claim 1, wherein the acoustic mesh controls an acoustic transfer function between a driver signal and a feedback microphone signal ($G_{sd}$) in a headphone earcup including the earphone cushion for a user wearing eyeglasses and the headphone earcup.

10. The earphone cushion of claim 1, wherein the cover includes pleather, an acrylic paint film, leather, or a composite material.

11. The earphone cushion of claim 1, wherein the body includes a material configured to compress when the earphone cushion contacts the portion of the user's head.

12. The earphone cushion of claim 11, wherein the acoustic mesh mitigates variability in an acoustic response of the material of the body.

13. The earphone cushion of claim 1, wherein the acoustic mesh has a Rayl value of approximately 6 to approximately 700.

14. A headphone earcup including the earphone cushion of claim 1.

15. The headphone earcup of claim 14, wherein the headphone earcup includes a port along an outer surface thereof.

16. The headphone earcup of claim 14, wherein the acoustic mesh permits acoustic energy from a front acoustic volume of the headphone earcup to enter the body of the cushion, and wherein a remainder of the cover along the inner side surface and the rear surface excluding the acoustic mesh substantially prevents acoustic energy from the front acoustic volume from entering the body of the cushion.

17. A headset comprising:

a pair of earcups having a front opening configured to be adjacent to an ear of a user when worn by the user; and a pair of earphone cushions sized to secure to the front opening of respective ones of the earcups, each earphone cushion having:

a body including: a front surface configured to engage or surround the ear of a user, an outer side surface, an inner side surface opposing the outer side surface, and a rear surface opposing the front surface;

a cover over a portion of the body, the cover having an outside radiating surface for contacting at least a portion of the user's head, the cover including a set of ports along at least one of (i) the inner side surface, (ii) the rear surface, or (ii) a junction between the inner side surface and the rear surface; and an acoustic mesh covering at least one port in the set of ports.

18. The headset of claim 17, further comprising a continuous headband spring section connecting each of the pair of earcups, wherein the continuous headband spring section permits adjustment of a vertical position of each of the earcups without modifying a length of the continuous headband spring section.

19. The earphone cushion of claim 11, wherein the cover includes the set of ports along at least one of (i) the inner side surface or (ii) the rear surface, wherein the material of the body separates the front surface from the rear surface and separates the inner side surface from the outer side surface.

20. The headset of claim 17, wherein the set of ports and covering acoustic mesh are located only along: the rear surface, or the rear surface and the inner side surface, wherein the body includes a material configured to compress when the earphone cushion contacts the portion of the user's head, and wherein the material of the body separates the front surface from the rear surface and separates the inner side surface from the outer side surface.

* * * * *